US008524410B2

(12) United States Patent
Allen

(10) Patent No.: US 8,524,410 B2
(45) Date of Patent: Sep. 3, 2013

(54) WATER REMOVAL FROM GAS FLOW CHANNELS OF FUEL CELLS

(75) Inventor: Jeffrey S. Allen, Houghton, MI (US)

(73) Assignee: Michigan Technological University, Houghton, MI (US)

( * ) Notice: Subject to any disclaimer, the term of this patent is extended or adjusted under 35 U.S.C. 154(b) by 957 days.

(21) Appl. No.: 11/894,335

(22) Filed: Aug. 21, 2007

(65) Prior Publication Data
US 2008/0193805 A1 Aug. 14, 2008

Related U.S. Application Data

(60) Provisional application No. 60/839,024, filed on Aug. 21, 2006.

(51) Int. Cl.
*H01M 8/02* (2006.01)
*H01M 8/04* (2006.01)
*H01M 8/10* (2006.01)

(52) U.S. Cl.
USPC .......................................... 429/450; 429/479

(58) Field of Classification Search
USPC .................... 429/13, 22, 30, 34, 450, 479
See application file for complete search history.

(56) References Cited

U.S. PATENT DOCUMENTS

| | | | | |
|---|---|---|---|---|
| 4,007,625 | A * | 2/1977 | Houben et al. | 73/24.01 |
| 6,253,782 | B1 * | 7/2001 | Raghu | 137/14 |
| 6,576,357 | B1 * | 6/2003 | Helmolt | 429/13 |
| 2002/0006534 | A1 * | 1/2002 | Wilkinson et al. | 429/13 |
| 2006/0093883 | A1 * | 5/2006 | Pristash | 429/30 |

OTHER PUBLICATIONS

Palan et al. (Journal of Power sources, 2006, 159:1061-1070).*
Edward D. Wilkes and Osman A. Basaran, "Forced Oscillations of Pendant (Sessile) Drops," Physics of Fluids, vol. 9, No. 6, pp. 1512-1528, Jun. 1997.
Poster for Society of Manufacturing Engineers Conference, Oct. 11-23, 2004, Livonia MI, "Oscillation of Water Droplets for Enhanced Water Removal from the Gas Flow Channels of Fuel Cells," Sheng Han Tseng, Russell Stacy, and Jeffrey S. Allen.
Michigan Technological University Graduate Student Poster Session, Spring 2006, Houghton, MI, "Oscillation of Water Droplet for Enhanced Water Removal from the Gas Flow Channels of Fuel Cells," Sheng Han Tseng, Russell Stacy, and Jeffrey S. Allen.
Sheng Han Tseng, "Fluidic Oscillator Design for Water Removal Enhancement in a PEM Fuel Cell," Thesis, Michigan Technological University, Dec. 2006.
Dr. Jeffrey Allen, "Challenge Fund Application for Fuel Cell Water Control System Prototype—Alternative Energy" submitted to Michigan Universities Commercialization Initiative, Feb. 19, 2007.

* cited by examiner

*Primary Examiner* — Jun Li
(74) *Attorney, Agent, or Firm* — Michael Best & Friedrich LLP

(57) ABSTRACT

An apparatus for water management in a fuel cell. The apparatus includes a fuel cell having a first porous electrode layer, a second porous electrode layer, a proton-conducting membrane positioned between the first electrode and second electrode layers, and a first and second bi-polar distribution plate, wherein the first bi-polar distribution plate is positioned on a top of the first electrode layer and defining a first gas flow channel, and wherein the second bi-polar distribution plate is positioned on a bottom of the second electrode layer and defining a second gas flow channel. The apparatus further includes a mechanism for oscillating liquid water formed in the gas flow channel and configured to remove the liquid water.

5 Claims, 2 Drawing Sheets

WATER REMOVAL FROM GAS FLOW CHANNELS OF FUEL CELLS

CROSS-REFERENCE TO RELATED APPLICATIONS

This application claims priority to Provisional Patent Application Ser. No. 60/839,024 filed on Aug. 21, 2006 entitled "WATER REMOVAL FROM GAS FLOW CHANNELS OF FUEL CELLS", the entire contents of which is hereby incorporated by reference.

BACKGROUND

The present invention relates to fuel cells, and more specifically to water management within a fuel cell.

During fuel cell operation, water droplets frequently form on the surface of gas diffusion layers within the fuel cell. Generally, the water droplets migrate through the gas diffusion layers into gas flow channels. In the gas flow channels, movement of the water can be inhibited by pinning of the three-phase region, commonly referred to as the contact line region. In the contact line region, the gas, liquid and solid phases collide.

A balance between keeping the membrane from becoming too dry or too wet must be maintained for efficient and reliable fuel cell operation. At high current densities, the production of liquid water may exceed the capacity of the gas streams to evaporate the water out of the fuel cell stack and drops of water will appear within the gas flow channels. If the water accumulation becomes too great, then the gas flow channel may become completely blocked by water and the fuel cell will "flood." Therefore, the water drops must be removed from the gas flow channels for reliable operation. Efficient removal of the product water is an important step in fuel cell operation and enables increased commercial utilization of fuel cells.

SUMMARY

In one embodiment, the invention provides an apparatus for water management in a fuel cell. The apparatus includes a fuel cell having a first porous electrode layer, a second porous electrode layer, a proton-conducting membrane positioned between the first electrode and second electrode layers, and a first and second bi-polar distribution plate, wherein the first bi-polar distribution plate is positioned on a top of the first electrode layer and defining a first gas flow channel, and wherein the second bi-polar distribution plate is positioned on a bottom of the second electrode layer and defining a second gas flow channel. The apparatus further includes a mechanism for oscillating liquid water formed in the gas flow channel and configured to remove the liquid water.

In another embodiment, the invention provides a system for operating a fuel cell. The system includes a fuel cell having a first porous electrode layer, a second porous electrode layer, a proton-conducting membrane positioned between the first electrode and second electrode layers, and a first and second bi-polar distribution plate, wherein the first bi-polar distribution plate is positioned on a top of the first electrode layer and defining a first gas flow channel, and wherein the second bi-polar distribution plate is positioned on a bottom of the second electrode layer and defining a second gas flow channel. The system further includes a mechanism for oscillating liquid water formed in the gas flow channel.

In another embodiment, the invention provides in a fuel cell system including a fuel cell, a method of water management for the fuel cell. The method includes passing a gas flow stream through a gas flow channel in the fuel cell, oscillating a liquid water drop in the gas flow channel to the natural frequency of the liquid water drop with a mechanism configured to oscillate a liquid water drop, and removing the liquid water drop from the gas flow channel.

In another embodiment, the invention provides a fluidic oscillator for use with a fuel cell. The fuel cell has a first porous electrode layer, a second porous electrode layer, a proton-conducting membrane positioned between the first electrode and the second electrode layers, and a first and second bi-polar distribution plate, wherein the first bi-polar distribution plate is positioned on a top of the first electrode layer and defining a first gas flow channel, and wherein the second bi-polar distribution plate is positioned on a bottom of the second electrode layer and defining a second gas flow channel. The fluidic oscillator includes an inlet port for receiving a fluid flow, a first outlet port communicating between the inlet port and the first gas flow channel, a second outlet port communicating between the inlet port and the second gas flow channel, a first control port configured to transmit a signal from the first outlet port to the inlet port, and a second control port configured to transmit a signal from the second outlet port to the inlet port. The fluid flow has a flow characteristic wherein when the flow characteristic drops below a threshold parameter, the fluidic oscillator produces a cyclic force to oscillate the water droplet.

Other aspects of the invention will become apparent by consideration of the detailed description and accompanying drawings.

DETAILED DESCRIPTION

Figure 1:
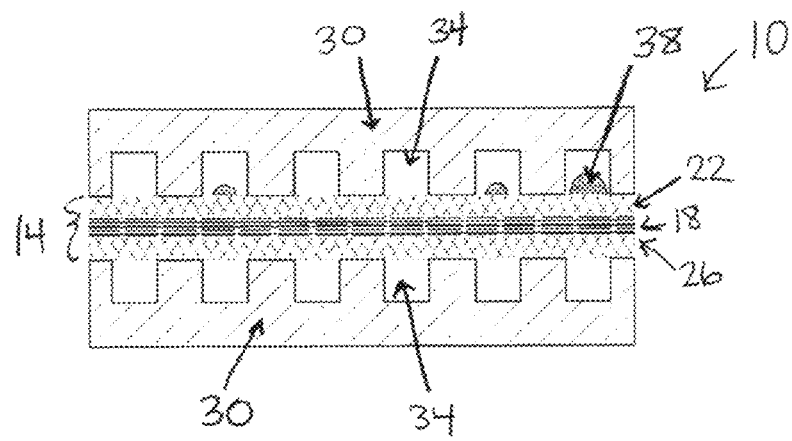
FIG. 1 is a fuel cell according to one embodiment of the present invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

In addition, and as described in subsequent paragraphs, the specific mechanical configuration illustrated in the drawings are intended to exemplify embodiments of the invention and that other alternative mechanical configurations are possible.

FIG. 1 illustrates a fuel cell 10 according to one embodiment of the present invention. In general, polymer electrolyte membrane (PEM) fuel cells 10 have a membrane electrode assembly 14 consisting of an ion-exchange, or electrolyte, membrane 18 disposed between two electrode layers, typically comprised of porous, electrically conductive sheet material. In some embodiments, the electrode layers are disposed between two gas diffusion layers, a cathode layer 22 and an anode layer 26. In some embodiments, the gas diffusion layers may include a generally rough, nonwetting, chemically inhomogenous surface, such as provided by teflonated carbon paper with or without a microporous layer. In a fuel cell 10, and as illustrated in FIG. 1, the membrane electrode assembly 14 is interposed between two separator plates 30. The separator plates 30 are substantially impermeable to reactant fluid streams. The separator plates 30 generally define gas flow channels 34 and are bi-polar distribution plates. The gas flow channels 34 are formed within the separator plates 30 during the manufacturing process, such that the gas flow channels 34 can be stamped, machined, or the like into the separator plates 30.

Typically, a PEM fuel cell 10 operates via a controlled hydrogen-oxygen reaction, wherein the byproducts of the reaction are heat and water. Accordingly, water product 38 forms within the membrane electrode assembly 14 and further migrates through the layers 22, 26. The water 38 further migrates to the gas flow channels 34. Water droplets 38 move through the gas flow channels 34 and out of the fuel cell 10 via a gas flow. However, at times, the movement of the water droplets 38 in the gas flow channel 34 can be inhibited by pinning of the three-phase region. The three-phase region is the line of contact where the gas, liquid, and solid phases collide. At high gas flow rates, the water droplets 38 can be removed via gas flow. However, at low gas flow rates, the water droplets 38 can remain pinned to the gas diffusion layer 22, 26 and continue to grow. As the water droplets 38 grow, the gas flow channels 34 can become clogged with the water droplets 38.

Figure 2:
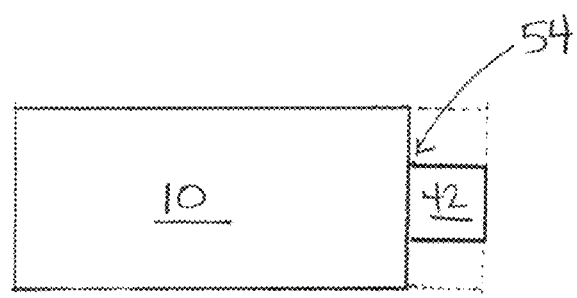
FIG. 2 is the fuel cell of FIG. 1 and a mechanism embodying the present invention.
Figure 3:
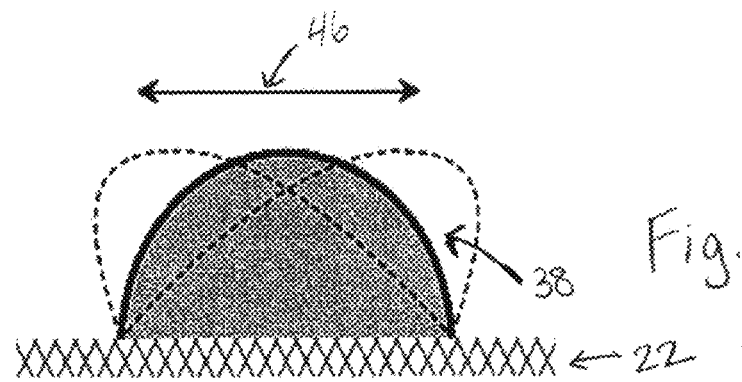
FIG. 3 is a schematic of an oscillating liquid water drop.

When the gas flow channels 34 become clogged with water droplets 34, it becomes necessary to dislodge the water droplets 38 for efficient fuel cell operation. The water droplets 38 can be removed with a mechanism 42 (FIG. 2) configured to oscillate the water droplets 38 at or near the water droplets' natural frequency. For oscillation near the natural frequency of the liquid-gas surface of the water droplet, minimal energy is required to induce large surface oscillations and relatively large inertia within the water droplet. As shown in FIG. 3, the oscillating force 46 acts on the liquid-gas surface of the water droplet 38. The oscillating force 46 is a cyclic force acting on the water droplet 38. The oscillation of the water droplet 38 utilizes the inertia of the water droplet to overcome the pinning energy of the drop contact line through oscillation at the drop surface, oscillation of the drop surface near the natural frequency, or oscillation of the drop surface at the natural frequency. The oscillating frequency can be kept constant (in which case the water droplets are permitted to grow until they reach a size at which the oscillating frequency matches the natural frequency of the water droplet), or can be varied to meet the natural frequency of various sizes of water droplets.

The mechanism 42 for oscillating the water droplet 38 at or near its natural frequency to remove the water droplet 38 produces a cyclic force, that can include, but is not limited to a pulsed gas flow via a fluidic oscillator positioned substantially entirely in an inlet manifold 54 (FIG. 2) of the fuel cell 10, a cyclic acoustic wave, a pulsed electromagnetic wave, and mechanical vibrations.

Figure 4:
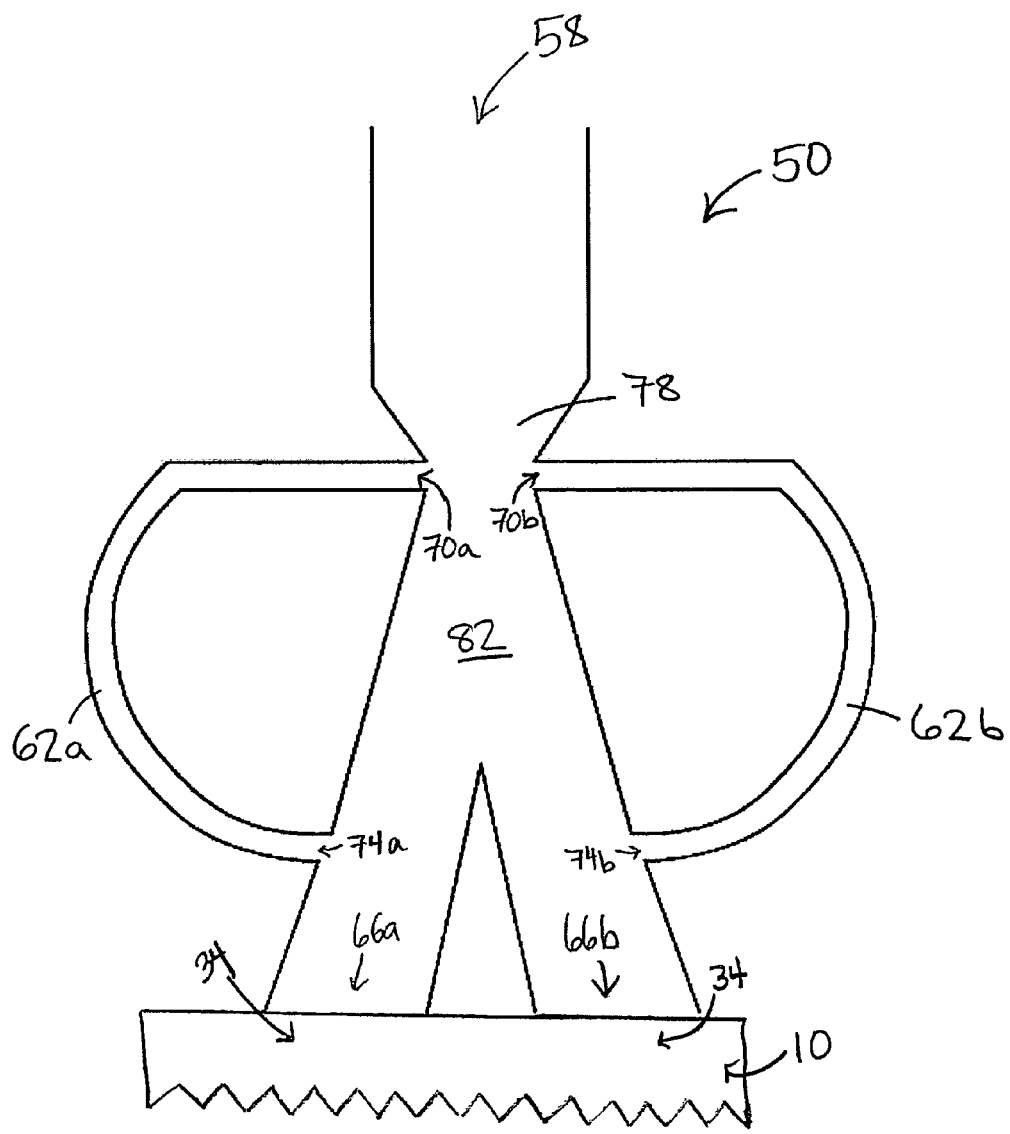
FIG. 4 is a schematic of a fluidic oscillator for use with the fuel cell of FIG. 1 according to one embodiment of the present invention.

FIG. 4 shows a schematic illustration of one embodiment of a fluidic oscillator 50 according to the present invention. The fluidic oscillator 50 includes an inlet port 58, first and second feedback conduits 62a, 62b, and first and second outlet ports 66a, 66b. The first and second feedback conduits 62a, 62b each have a control port 70a, 70b, and a start port 74a, 74b, respectively. The inlet port 58 is configured to receive a flow of fluid. The fluid flow is comprised of fuel cell components, such as hydrogen and water. The inlet port 58 includes a nozzle 78 that accelerates the fluid flow into a bridge 82. The bridge 82 provides fluid communication between the inlet port 58 and the first and second outlet ports 66a, 66b. The fluid flow from the nozzle 78 is a focused jet stream, resulting in a reduced static pressure. Each start port 74a, 74b communicates with the respective outlet ports 66a, 66b. Each control port 70a, 70b communicates with the output end of the nozzle 78, where the nozzle 78 meets the bridge 82. The outlet ports 66a, 66b can further communicate with gas flow channels 34.

When operation of the fuel cell is initiated, the focused jet stream flowing out of nozzle 78 into bridge 82 flows into both outlet ports 66a, 66b. The flow eventually favors one side or other (first outlet port 66a in this example), and fluid flow is directed from the inlet port 58 to the first outlet port 66a. Fluid flow to the first outlet port 66a initiates a pressure pulse at the first start port 74a that travels through the first feedback conduit 62a to the first control port 70a. The pressure pulse exits the first feedback conduit 62a at the first control port 70a and deflects the fluid flow to the second outlet port 66b. Fluid flow to the second outlet port 66b initiates a pressure pulse at the second start port 74b that travels through the second feedback conduit 62b to the second control port 70b. The pressure pulse exits the second feedback conduit 62b at the second control port 70b and deflects the fluid flow to the first outlet port 66a. The fluidic oscillator 50 operates in this manner to create the fluid flow oscillations. Additionally, the focused jet of fluid flow from the nozzle 78 results in a low static pressure, which allows for a more easily deflected fluid flow when acted upon by the pressure pulses from the control ports 70a, 70b than if the fluid flow had a higher static pressure. The feedback conduits 62a, 62b provide closed loop feedback to deliver the pressure pulses to the control ports 70a, 70b, so that the oscillator 50 is not vented. In a fuel cell application, it is desirable to avoid venting because the fluid flow contains hydrogen.

The pressure pulse in the feedback conduits 62a, 62b is an acoustic wave, or operates at the speed of sound. The frequency of the oscillations can depend on any flow parameters that will affect the speed of sound, including, but not limited to, density, pressure, temperature, and relative humidity. The frequency of the oscillation can also be affected by factors, including, but not limited to the length of the feedback conduits, or another factor that will affect the time of travel of an acoustical wave from the start ends 74a, 74b to the control ports 70a, 70b for a given wave speed.

The pulsed fluid flow causes water droplet motion. During the onset of motion within the water droplet, the inertia of the water droplet is significant; whereas, at steady flow, the inertia becomes insignificant. The timing and amplitude of the pulses, or the cyclic force, produces a more steady motion of the water droplets than steady shear flow by utilizing the transient liquid momentum to overcome the dissipation due to contact line motion.

Various features and advantages of the invention are set forth in the following claims.

What is claimed is:

1. A method for removing a liquid water droplet from a gas flow channel in a fuel cell having a first porous electrode layer; a second porous electrode layer; a proton-conducting membrane positioned between the first electrode and second electrode layers; and a first and second bi-polar distribution plate, wherein the first bi-polar distribution plate is positioned on a top of the first electrode layer and defining a first gas flow channel, and wherein the second bi-polar distribution plate is positioned on a bottom of the second electrode layer and defining a second gas flow channel; and a mechanism for oscillating a liquid water droplet that is pinned with a pinning force within one of the first and second gas flow channels, the liquid water droplet having inertia and a liquid-gas surface, the method comprising the steps of:

oscillating, with the mechanism for oscillating, the liquid-gas surface of the liquid water droplet at the natural frequency of the liquid water droplet; and in response to oscillations acting on the inertia of the liquid water droplet, creating inertial forces within the liquid water droplet sufficient to overcome the pinning force.

2. The method of claim 1, wherein the mechanism for oscillating includes a fluidic oscillator and wherein oscillating the liquid-gas surface of the liquid water droplet is performed with the fluidic oscillator.

3. The method of claim 2, wherein the step of oscillating the liquid-gas surface includes generating, with the fluidic oscillator, a pulsed fluid flow to excite the liquid water droplet to the natural frequency of the liquid water droplet.

4. The method of claim 3, further comprising adjusting the pulsed fluid flow as a function of one of at least density, pressure, temperature and relative humidity.

5. The method of claim 1, wherein the step of oscillating the liquid-gas surface includes generating, with the mechanism for oscillating, a cyclic acoustic wave configured to excite the liquid water droplet at the natural frequency of the liquid water droplet.

\* \* \* \* \*